United States Patent [19]

May

[11] 4,340,410
[45] Jul. 20, 1982

[54] FLOAT GLASS FORMING CHAMBER WITH ISOLATED HEATING MEANS

[75] Inventor: Earl L. May, Irwin, Pa.

[73] Assignee: PPG Industries, Inc., Pittsburgh, Pa.

[21] Appl. No.: 222,397

[22] Filed: Jan. 5, 1981

[51] Int. Cl.³ .................................................. C03B 18/22
[52] U.S. Cl. .................................. 65/182.3; 65/182.1; 65/182.5; 65/346; 110/332
[58] Field of Search ............... 65/182.1, 182.3, 182.5, 65/346; 110/332

[56] References Cited

U.S. PATENT DOCUMENTS

| | | | |
|---|---|---|---|
| 3,486,869 | 12/1969 | Alonzo et al. | 65/27 |
| 3,486,876 | 12/1969 | Augustin et al. | 65/345 X |
| 3,575,694 | 4/1971 | Bigliardi et al. | 65/63 |
| 3,976,460 | 8/1976 | Kompare et al. | 65/182.1 X |

Primary Examiner—Arthur D. Kellogg
Attorney, Agent, or Firm—Dennis G. Millman

[57] ABSTRACT

A float glass forming chamber is provided with electrical heating elements having separate housings and separate electrical shut-off means, so that any heating element can be independently disconnected for replacement or for modifying the heating pattern.

6 Claims, 5 Drawing Figures

FLOAT GLASS FORMING CHAMBER WITH ISOLATED HEATING MEANS

BACKGROUND OF THE INVENTION

In the float process for forming flat glass, molten glass is drawn from a melting furnace and passed to a forming chamber (or "float bath") where the molten glass is deposited onto an elongated pool of molten metal such as tin or copper or alloys thereof. There, a ribbon of glass is stretched to the desired thickness as it progresses along the elongated pool of molten metal and is then withdrawn from the forming chamber as a continuous ribbon at the exit end of the forming chamber. Because of the fluid support provided by the molten metal to the glass, glass of superior optical quality can be produced by the float process.

The roof of the float forming chambers commonly in use comprises a complex grid of relatively small ceramic pieces interlocked with one another and suspended from above by a large number of metallic rods. The design includes a large number of vertically extending electrical heating units supported within openings in the grid. Other openings in the grid are filled with blind plugs. The result is an interior roof surface which is non-planar and has a relatively large surface area and a large number of joints and vertically extending cracks and surfaces. Such a complex roof structure encourages condensation and dripping of volatilization products. The large number of crevices permits ingress of cooler exterior atmosphere which promotes condensation. The nonplanar surfaces tend to increase running and coalescing of condensation products. More recent designs of float bath roofs have simplified the support grid design so as to extend across the float chamber in only the transverse direction for the sake of simplified construction. However, the revised design still possesses the drawbacks of a large number of joints and non-planar interior surfaces.

The conventional float forming chamber entails a maze of bus bars and leads above the roof to connect the electrical heating elements to a power source. The entire electrical connection arrangement is enclosed within a large chamber known as the upper plenum, within which a controlled atmosphere is usually maintained to cool and prevent oxidation of the electrical connectors. Unfortunately, such an arrangement renders access to the heating elements and their connections extremely difficult during operation of the float chamber due to the high temperatures and closely spaced electrical conductors. It is desired occasionally to disconnect or remove a heating element to alter the heating pattern or to replace a damaged element, but because of the difficult access in prior art float chamber designs, such modifications or repairs were carried out during operation in only the most dire circumstances. Usually, the modifications or repairs were postponed until a major shut-down of the operation. Furthermore, when access was attempted during operation, a major upset of the glass forming process could result, since it was required to turn off the heat in a substantial portion of the forming chamber. Therefore, there has been a need for a more versatile heater arrangement for float forming chambers.

Related U.S. patent applications include Ser. No. 195,283 filed on Oct. 8, 1980, now U.S. Pat. No. 4,322,235 by Ronald L. Schwenninger entitled "FLOAT GLASS FORMING CHAMBER WITH HORIZONTAL HEATING ELEMENTS," and Ser. No. 209,636 filed on Nov. 24, 1980, now U.S. Pat. No. 4,322,236 by John E. Sensi entitled "FLOAT GLASS FORMING CHAMBER HAVING LOW PROFILE ROOF."

SUMMARY OF THE INVENTION

In the float glass forming chamber of the present invention electrical connections to each heating element are enclosed within a separate, compact housing. Associated with each housing is a switching device for independently disconnecting each heating element from the power source. In this manner, the power to any single heating element may be shut off, its housing opened, and the heating element removed without disrupting the functioning of the remainder of the heating elements, and with very little disturbance to the ongoing forming process.

In the preferred embodiment, the heating elements extend horizontally through side walls of the forming chamber, and the connection housings extend from the sides of the forming chamber. This arrangement further expedites access to the heating elements because the housings are at a convenient elevation and are no longer in the hot environment above the forming chamber as in the prior art.

Other advantages accrue from the preferred embodiment of forming chamber for which the present invention is particularly suitable. Orienting the heating elements horizontally and locating the electrical connections along the sides of the forming chamber permits the use of a simplified roof structure and a reduction in the size of the upper plenum above the roof, both of which lessen the tendency of condensed volatiles to drip from the roof onto the glass ribbon. Also, providing relatively small housings for the electrical connections instead of an overall plenum advantageously enhances heat transfer for cooling the connections.

THE DRAWINGS

FIG. 2 is a side view of the preferred embodiment of FIG. 1a partly broken away along line 2—2 in FIG. 1a.

DETAILED DESCRIPTION

Figure 1:
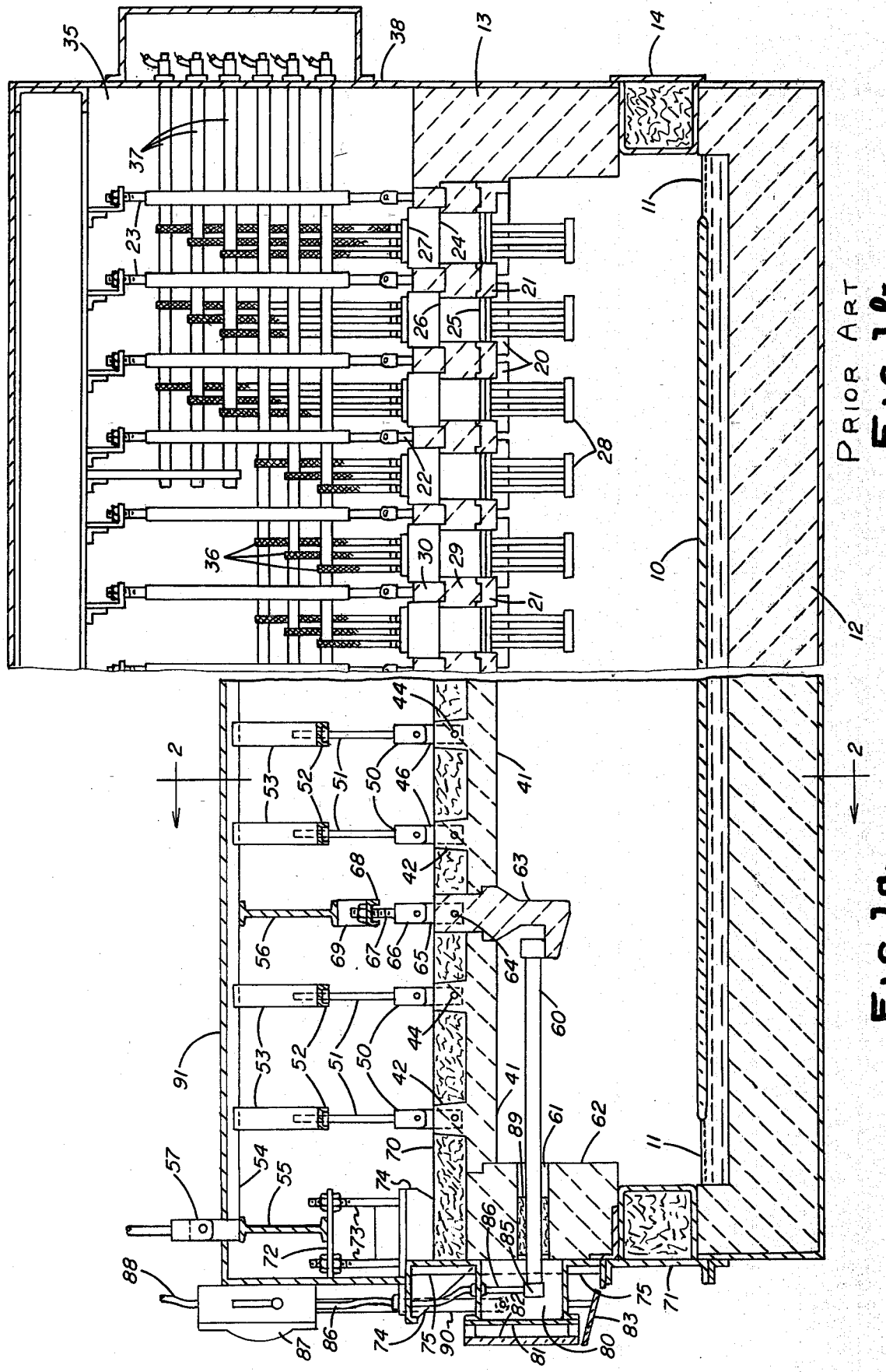
FIG. 1a is a transverse cross-sectional view of a preferred embodiment of a float glass forming chamber in accordance with the present invention.
FIG. 1b is a transverse cross-sectional view of a conventional prior art float glass forming chamber shown for comparison.

In FIG. 1a and FIG. 1b there is shown, side-by-side for comparison, float bath roof designs in accordance with a preferred embodiment of the present invention (FIG. 1a) and the conventional prior art float bath roof (FIG. 1b). In both, a ribbon of glass 10 being attenuated to the desired thickness floats on a pool of molten metal 11 (usually tin, although copper or mixtures of tin and copper may also be employed). Minor amounts of other metals such as iron may also be included in the molten metal bath. The metal bath is contained within a refractory vessel comprising a bottom 12 and side walls 13 having access openings that may be closed by means of side seals 14.

In the prior art roof arrangement, as shown in FIG. 1b, the basic support grid comprises a large number of transversely extending support members 20 and longitudinally extending support members 21, both of which are preformed ceramic pieces. Vertically extending hanger rods 22 have hook-like members at their lower ends (not shown) which engage and interlock the ends of adjacent transverse support members 20. The longitudinal support members 21 span adjacent rows of the transverse support members 20 upon which they rest at opposite ends. The hanger rods 22 are, in turn, supported from above by rods 23 fastened at their upper ends to the overhead superstructure. The spacing between adjacent hanger rods both transversely and longitudinally in such a system is typically on the order of 30 centimeters or less. Into the rectangular openings in this grid are inserted a large number of heater elements, each of which consists of a sandwich of a plurality of pieces of refractory materials 24, 25, 26 and 27 fastened together by means of vertically extending tie rods (not shown) and a vertically extending, three-legged, electrical resistance heating element 28 passing through the refractory pieces. The bottom refractory member 25 of the composite heating element overlaps and rests upon adjacent transverse support members 20. The spaces between the heating elements are filled with additional refractory members 29 and 30, which rest on the longitudinal support members 21 between the hangers 22. Heater elements are shown inserted into each of the grid openings in FIG. 1b as is the case in some zones of a conventional float chamber, but in other zones a particular cross-section may have some or even all of the openings filled with blind plugs rather than heater elements.

The prior art arrangement as shown in FIG. 1b employs a relatively large upper plenum chamber 35 to accommodate electrical connections to the heater elements. Each leg of the resistance heater elements 28 is connected at its upper end to a lead 36 which is, in turn, connected to a bus bar 37 in a three-phase alternating current system. Because the float chamber is usually provided with an inert or reducing gas atmosphere, the entire chamber, including the upper plenum, is enclosed in a metal casing 38 to make the structure essentially gas-tight. To prevent oxidation of and to cool the electrical connections with the upper plenum 35, the inert or reducing gas atmosphere is usually fed to the upper plenum 35 from which it passes into the main forming chamber through joints in the roof structure. This infusion of relatively cool gases through the roof structure is also believed to have a detrimental effect on the problem of drippage from the roof.

Figure 2:
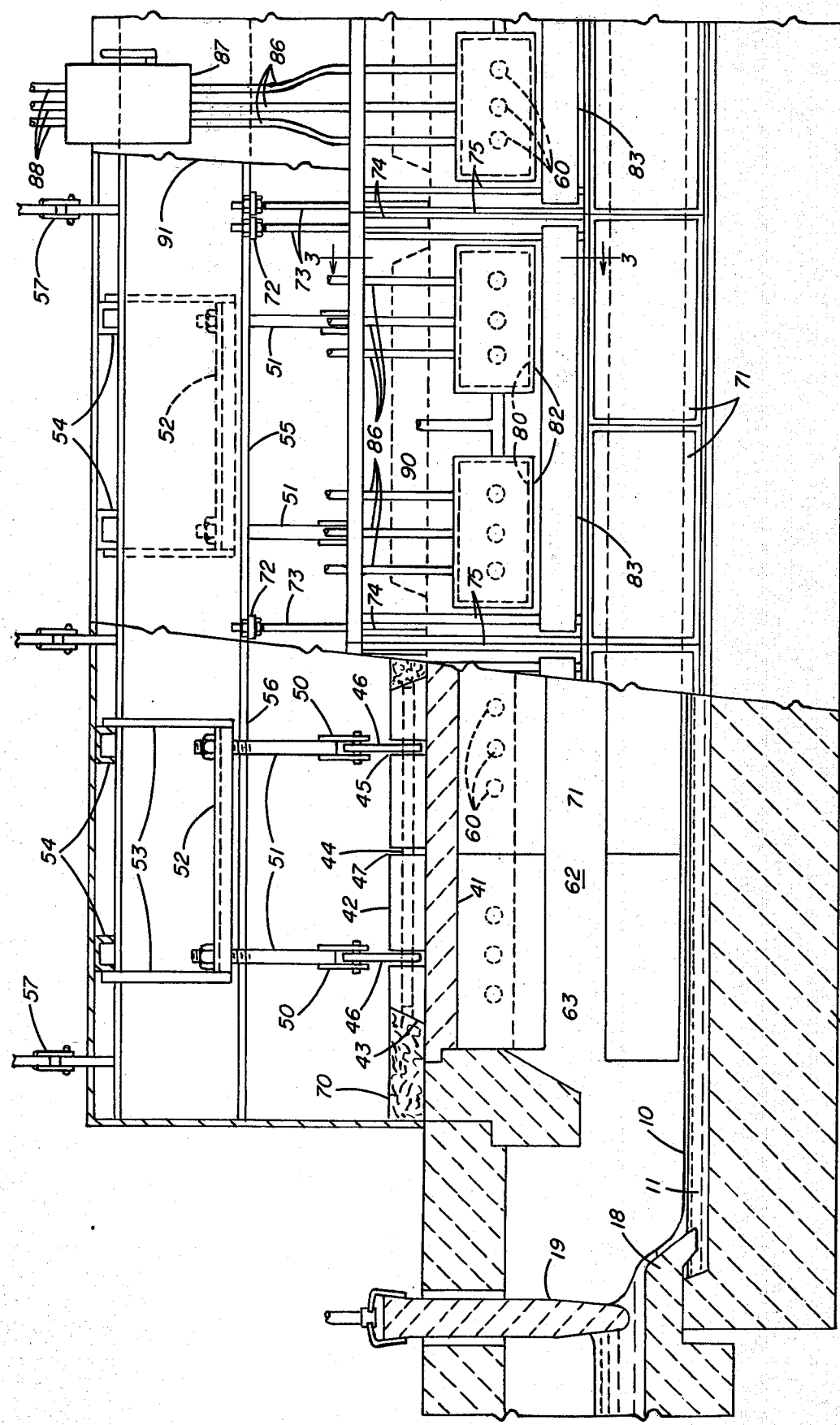

A preferred embodiment of the float chamber roof of the present invention may be seen in FIG. 1a and FIG. 2. Also, in FIG. 2 there may be seen a typical inlet to a float chamber where molten glass is delivered between a threshold 18 and a metering gate or "tweel" 19 onto the molten metal 11 of the float forming chamber. A particular feature of this embodiment is a roof structure comprised largely of a plurality of flat slabs 41 presenting an essentially horizontal, planar bottom surface to the interior of the float chamber. Such a slab may comprise a joint-free section of the roof much larger than those in a conventional float chamber roof. A slab 41 typically may have at least one horizontal dimension on the order of at least about one half meter and preferably greater than one meter, and a horizontal area of at least about one half square meter. A thickness on the order of 7 to 20 centimeters is typical. In the particular embodiment described in detail herein, a typical slab may have the following dimensions: 1.2 meters by 1.2 meters by 10 centimeters, with ribs an additional 10 centimeters high, 10 centimeters wide, and 1.0 meter long. The actual size of a slab will depend upon the particular refractory being used, the geometry and thickness of the slab, and the operating conditions to which the slab will be exposed. While the maximum benefit would appear to be attained from the use of the maximum sized slab throughout the float chamber, advantages may be obtained by employing the slab roof structure in only portions of a float chamber, particularly in areas where drippage may be concentrated. Furthermore, constructional expediencies may require that slabs of less than the maximum area be employed in portions of the roof. Although rectangular slabs are shown in the drawings, it should be apparent that the slabs could have any shape in order to conform to any irregularities of the forming chamber structure or to accommodate any ancillary equipment.

The roof structure described herein constitutes the subject matter of copending U.S. patent application Ser. No. 222,396 filed on even date herewith by Earl L. May and entitled "FLOAT GLASS FORMING CHAMBER WITH EXTERNALLY SUPPORTED ROOF." The disclosure of that application is hereby incorporated by reference for additional information regarding the roof structure.

It has been found desirable to fabricate the roof slabs 41 by molding a castable refractory material. Castable refractories suitable for use are well-known in the art and are preferably of the type characterized as hydraulic setting refractory concrete. Desirable characteristics include durability and strength at the operating temperatures to which the material will be exposed (up to about 1,000° C.) and chemical resistance to the reducing gas atmosphere usually maintained in the forming chamber. Accordingly, the preferred castable refractories have been found to have alumina contents of about 50 to 70 percent by weight and low iron and sulfur contents. Examples of suitable commercially available castable refractories include those sold under the names "Kaocrete 30" and "Kaocast" (Babcock-Wilcox Company, New York, N.Y.), "Alusa" (Harbison-Walker Refractories, Pittsburgh, Pa.), and "Purocast" (Kaiser Refractories, Columbiana, Ohio).

Because of the size of the roof slabs 41, it is important to support the slabs with adequate distribution of their weight so as to avoid unduly concentrating stresses in the slabs that could lead to cracking. This is accomplished in the present invention by means of horizontally extending bores 43 in the upper portions of each slab 41, within each of which is received a girder member which may preferably comprise a pipe or rod 44 as shown in the drawings. In the preferred embodiment depicted, the bores 43 are located within rib extensions 42 of the slabs which are integral portions of the slabs formed during molding of the slabs. The ribs 42 provide an effective location from which to support the slabs while minimizing the thickness and thus the weight of the slabs. Alternatively, if the main portions of the slabs are made sufficiently thick, the bores 43 could be located in the main portion of the slabs, in which case ribs would not be required. In the preferred embodiment, each slab is provided with two ribs 42, each with a corresponding bore 43 and pipe 44, but fewer or greater numbers of ribs may be employed depending upon the size of the particular slab.

Referring to FIG. 2, it may be seen that each rib 42 is provided with a pair of slots 45 through which hanger plates 46 engage the girder pipes 44. A pair of hanger plates 46 are shown engaging each pipe 44, but it should be understood that fewer or greater numbers of plates 46 may be employed depending upon the length to be supported. It is preferred that the ribs 42 and the girder means 44 extend along the majority of the length of the respective slab 41. Two load-bearing ribs per slab have been found sufficient, but it is preferred to provide additional transversely extending ribs on at least slabs located in the hotter portions of the forming chamber. The transverse ribs reinforce the slab and have been found to improve resistance to cracking at high temperatures, apparently by making the shape of each slab more symmetrical thermally. In order to improve resistance to thermal breaking, it has been found desirable to include notches 47 along the lengths of the ribs in addition to the notches 45 for receiving the hanger plates. These additional notches 47 accommodate thermal expansion and are arranged symmetrically on the ribs.

It can be seen in FIGS. 1a and 2 that each slab 41 is independently supported, and although the edges of adjacent slabs overlap, the slabs and the adjacent structures do not support one another as in prior art forming chamber arrangements. The result is that the area of each slab can be maximized with no more structural strength than required to support its own weight. In the embodiment shown in the drawings, four support points are provided for each slab, but is should be understood that a greater or smaller number may be utilized depending upon the size of the slab. The hanger plates 46 may be linked to the overhead main roof structure by any suitable hanger means. In the embodiment illustrated, the hanger means comprise a clevis 50 pinned to each hanger plate 46, and each clevis 50 is affixed to the lower end of a vertically extending hanger rod 51. The hanger rods 51 may be supported in pairs at their upper ends by stringers 52 which, in turn, hang by means of brackets 53 from overhead channel members 54. The channel members 54 extend across the width of the forming chamber and rest on longitudinally extending main roof support beams 55 and 56. The beams 55 and 56 are supported by way of clevis hangers 57 to overhead structural members (not shown).

In conjunction with the roof structure of the present invention it is highly advantageous to employ electrical heating elements which extend into the forming chamber through the side walls thereof rather than through the roof as in conventional prior art forming chambers. In this manner the electrical connections may be located along the side walls of the forming chamber. Also, the number of joints in the roof structure can be substantially reduced, and the slabs 41 can have essentially uninterrupted, planar inner surfaces. As can be seen in FIG. 1a, it is preferred to employ horizontally extending electrical heating elements 60, each of which may be the same three-legged resistance heaters for use with three-phase alternating current as employed in the vertical mode in prior art forming chambers, but typically of a larger size here. Each heating element 60 extends through an opening 61 in the respective side wall 62, and at its inner end rests upon a refractory support element 63. As can be seen in FIG. 2, the heating elements 60, in at least the entrance end of the forming chamber, are spaced at regular intervals along each side wall of the forming chamber. The support elements 63 may abut one another in shiplap fashion to form a substantially continuous row extending longitudinally along at least those portions of the chamber where the heating elements are closely spaced. Each support element 63 may be supported from above in a manner similar to that of the slabs 41. Each support element 63 may be provided with a longitudinally extending load distributing rod or tube member 64 engaged by a hanger plate 65, which is, in turn, hung from a clevis 66 affixed to a vertically extending shaft 67. Each shaft 67 may be affixed to a horizontally extending stringer 68 which is hung from a main support beam 56 by means of downwardly extending tabs 69 (see FIG. 1a). The sides of the support elements 63 may be rabbeted so as to form an overlapping joint with the adjacent roof slabs 41.

The insulating value of the roof may be increased by applying a layer of insulating material 70 over the refractory roof slabs 41. The insulating material may be a high-temperature mineral wool blanket. By selecting the thickness of the insulating layer, the heat flux through the roof may be established, and by employing different thicknesses in different areas, some control over the cooling pattern of the glass ribbon can be achieved. Sealing of the roof joints may also be aided by inserting a layer of refractory fiber paper in the joints of the roof. A suitable refractory paper is an alumina-silica fiber paper sold under the name "Fiberfrax" by Carborundum Company, Niagara Falls, N.Y.

The side walls 62 of the forming chamber are conveniently suspended in sections. The sidewalls are spaced above the basin 12 so as to provide a substantially continuous slot along the length of the chamber for insertion of glass stretching devices and other equipment at substantially any point along the length of the chamber. At locations where equipment is not inserted, the slot is closed by side seal means 71. In the specific embodiment illustrated, each side wall section corresponds approximately to the length of a roof slab 41 and is provided with two rectangular openings 61 for insertion of heater elements. Referring to FIG. 1a, support for each section of the side walls 62 is based upon main support beam 55. Above each end of each side wall section a transversely extending plate 72 is welded to the underside of beam 55 and carries a pair of vertically extending rods 73. The rods 73 at their lower ends are affixed to a bracket structure 74 from which extends downwardly a vertically extending channel member 75 which constitutes the main vertical support member for the side wall section. The channels 75 of adjacent side wall sections are abutted against one another and sealed together, thereby providing a continuous, sealed side wall structure.

Figure 3:
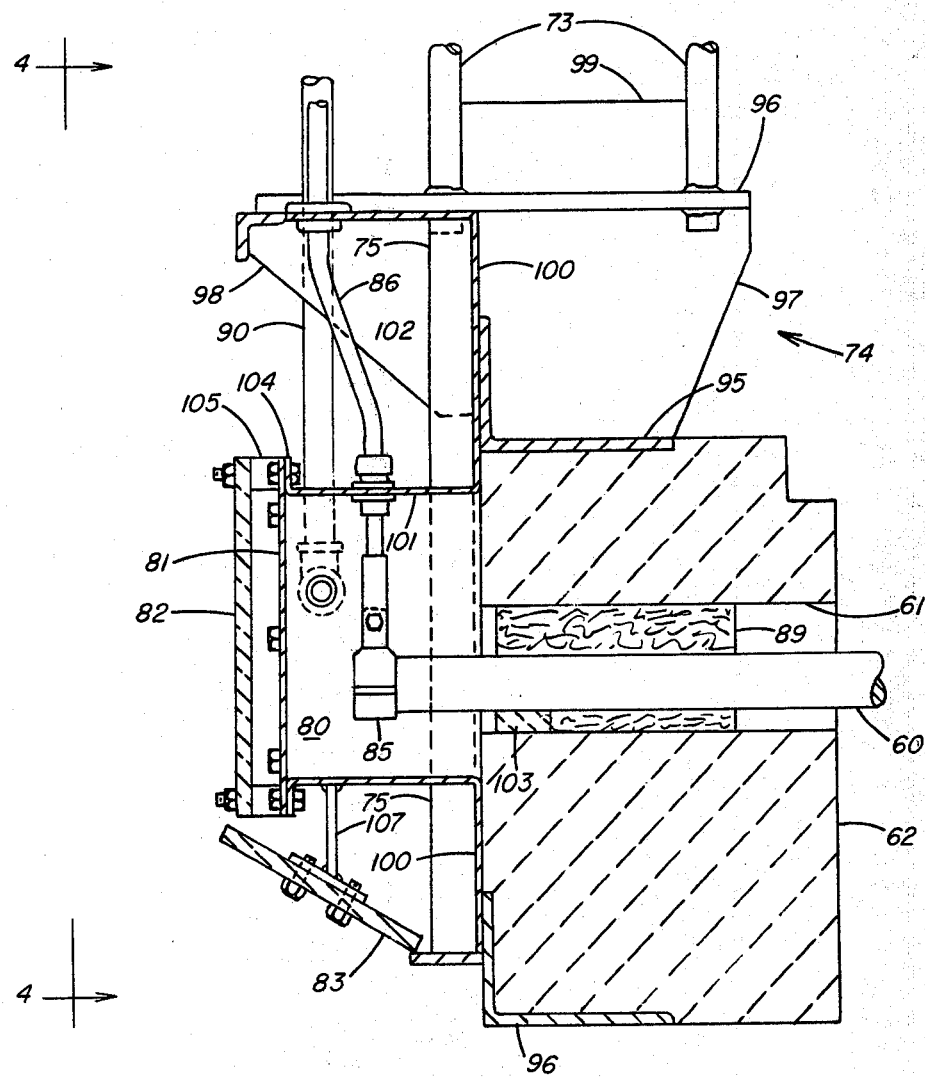
FIG. 3 is an enlarged, transverse, cross-sectional view of a side wall and electrical connection housing of the preferred embodiment, taken along line 3—3 in FIG. 2.
Figure 4:
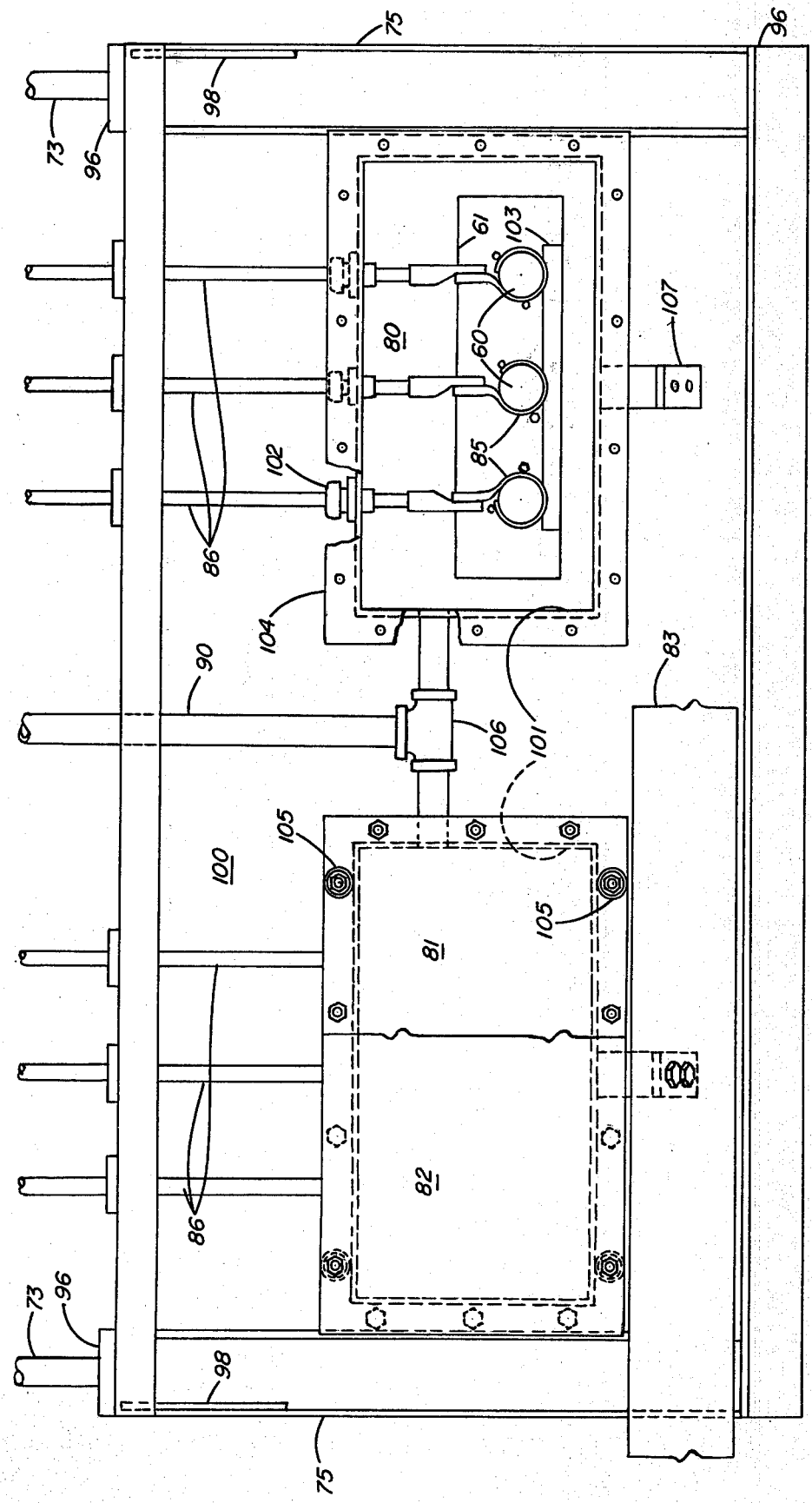
FIG. 4 is an enlarged side view of the side wall section of FIG. 3, showing two electrical connection housings, both partly broken away.

Referring to FIGS. 1a and 2, as well as the more detailed showings in FIGS. 3 and 4, the electrical connections to each heating element 60 are enclosed in a gas-tight housing 80. Each housing 80 is provided with a removable cover 81, on the outside of which is affixed a heat shield 82. An additional heat shield 83 is mounted below the housings 80. The purpose of both heat shields is to protect the electrical connections within each housing 80 from excessive heat escaping from the forming chamber when a side seal 71 is opened. The heat shields may be made of insulating board material. Within each housing 80 electrical connection is made to the outer end of each leg of the heating element 60 by means of a clamp 85 to which is connected an electrical cable 86 that passes through the wall of the housing to a switchbox 87. Trunk line cables 88 connect each switchbox 87 to a power substation. Such an electrical connection arrangement advantageously eliminates the maze of bus bars associated with prior art designs and provides independent control of each heating element. The ability to cut off power from an individual heating element permits damaged heating elements to be replaced without shutting off the heat from a major section of the forming chamber, and it permits the pattern of heat input to the forming chamber to be quickly altered by shutting off some or all of the heating elements in a particular zone of the forming chamber.

Thermal communication of the hot forming chamber atmosphere with the interior of the electrical connection housings 80 is retarded by fibrous insulation 89 packed into each opening 61 around the legs of the heating elements 60. It is preferred that at least a portion of the non-oxidizing atmosphere of the forming chamber be introduced through the housings 80, whereby corrosion of the electrical connections therein is retarded by the nonoxidizing atmosphere and by the cooling affect of the incoming gas. The non-oxidizing gas may be introduced into some or all of the housings 80 by means of a pipe 90. The gas passes from the interior of the housings into the forming chamber through the porous insulation 89. The entire forming chamber structure is maintained substantially gas-tight by a metal casing 91. Because the electrical connections are located on the side of the forming chamber of the preferred embodiment, the volume above the roof enclosed by the casing 91 is considerably smaller than the enclosed upper plenum space of conventional prior art forming chambers as in FIG. 1b. Additionally, since in the preferred embodiment the nonoxidizing atmosphere is not forced through roof joints, but is introduced around the heating elements, there is less likelihood of inducing condensation and drippage. It may be desired in some cases to introduce additional atmosphere directly into the forming chamber through feeder pipes at other locations.

Additional details of the side wall construction and electrical connection housings may be seen in FIGS. 3 and 4. In FIG. 3 it may be seen that the side wall refractories 62 are held between a pair of angle irons 95 and 96, both of which are attached to the vertical channel 75. The bracket assembly 74 that supports an end of each side wall section is comprised of a plate 96 welded to the bottom ends of rods 73, a back gusset 97, and a front gusset 98. A reinforcing plate 99 may be welded between the rods 73. A metal sheet 100 covers the face of the side wall section and forms the side walls 101 of the housings 80. The electrical cables 86 pass through openings in the upper side of the housing wall 101, each of which is equipped with a grommet 102 to seal the opening and protect the cable. A spacer block 103 of rigid nonconductive material is placed on the bottom of each side wall opening 61 for the legs of the heating element 60 to rest upon.

Each connection housing 80 is provided with a flange 104 around its outer perimeter for receiving the cover 81. The heat shield 82 is spaced from the cover 81 by means of annular spacers 105. The lower heat shield 83 is carried on brackets 107 extending from the underside of each housing 80. In the embodiment shown, the supply pipe 90 for the non-oxidizing atmosphere is split into two branches by means of a fitting 106 so as to supply two adjacent housings 80 through their sidewalls.

A specific preferred embodiment has been described in detail for the sake of illustrating the invention and for disclosing the best mode, but it should be understood that other variations and modifications as are known to those of skill in the art may be resorted to without departing from the scope of the invention as defined by the claims which follow.

I claim:

1. Apparatus for forming flat glass by the float process comprising an enclosure adapted to hold a pool of molten metal, means for delivering a stream of molten glass onto the molten metal, means for drawing the glass along the pool of molten metal so as to form the glass into a ribbon, and a plurality of electrical resistance heating elements extending into the enclosure, the improvement comprising: a plurality of gas-tight housings, each housing enclosing the exterior terminus of a separate one of the heating elements, a plurality of electrical switch means outside each housing alongside the enclosure, each switch means corresponding to one of the heating elements, and electrical leads connected to the portion of each heating element within each housing and extending through the housing walls to the respective electrical switch means.

2. Apparatus for forming flat glass by the float process comprising an enclosure adapted to hold a pool of molten metal, means for delivering a stream of molten glass onto the molten metal, means for drawing the glass along the pool of molten metal so as to form the glass into a ribbon, a plurality of electrical resistance heating elements extending horizontally through side walls of the enclosure, exterior end portions of each heating element being enclosed by a separate gas-tight housing, and electrical switch means outside each housing alongside the enclosure for selectively connecting or disconnecting each heating element from an electrical power source.

3. The apparatus of claim 1 or 2 wherein said housings extend from side walls of the enclosure.

4. The apparatus of claim 3 wherein each of said housings has a removable cover.

5. The apparatus of claim 3 further including means to introduce a non-oxidizing atmosphere to each of said housings.

6. The apparatus of claim 2 wherein the electrical switch means comprise a plurality of switchboxes outside of and adjacent to each of the housings and including electrical leads extending from each switchbox to the interior of a respective housing and connected therein to a respective heating element.

* * * * *